May 5, 1970     E. APPELT     3,509,813
PAN CONSTRUCTION
Filed April 17, 1968
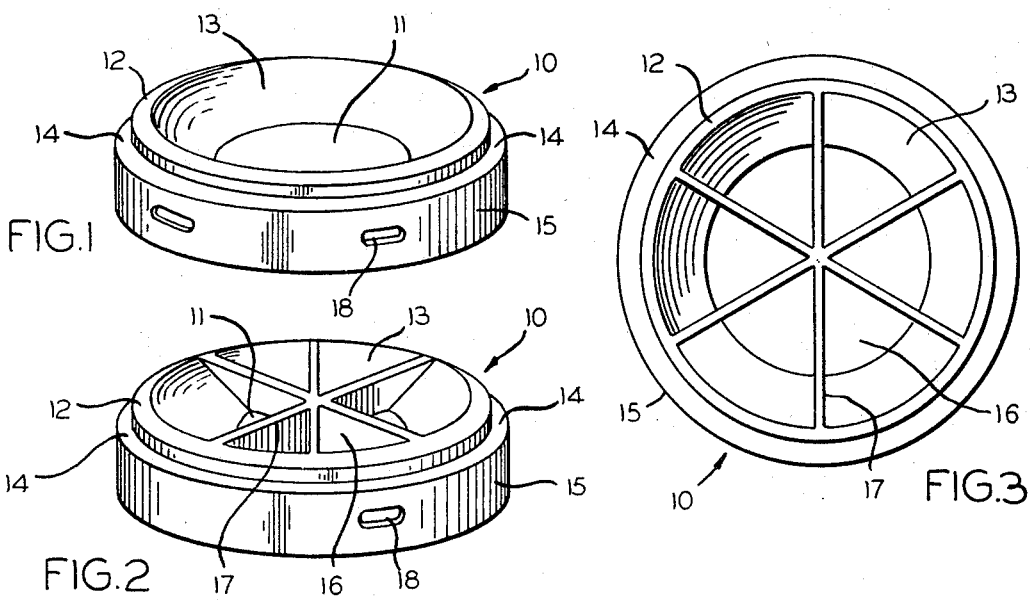
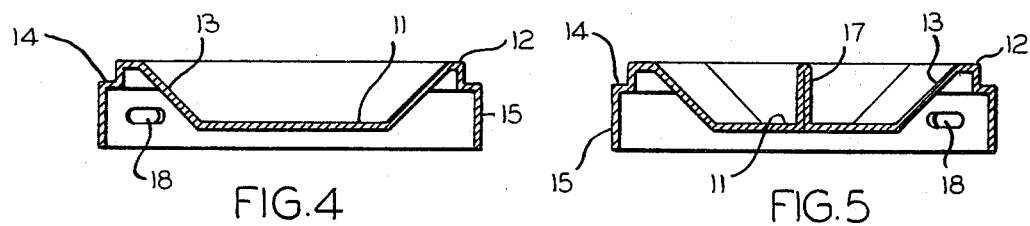
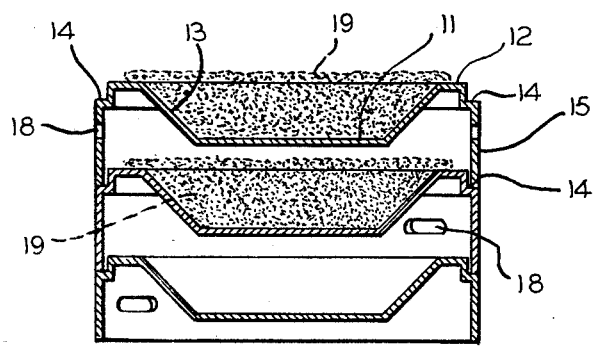
INVENTOR
EDNA APPELT
BY
*Alter and Weiss*
ATTORNEYS

United States Patent Office 3,509,813
Patented May 5, 1970

3,509,813
PAN CONSTRUCTION
Edna Appelt, 151 W. Crawford Ave.,
Milwaukee, Wis. 53207
Filed Apr. 17, 1968, Ser. No. 722,003
Int. Cl. A23p 1/00
U.S. Cl. 99—432                                                 2 Claims

ABSTRACT OF THE DISCLOSURE

Sectionalized baking pans that are amenable for stacking with the baked contents disposed therein. The pans have side aprons and integral bake units and are provided with a peripheral indented section for receiving the aprons of a pan stacked thereupon to form stable cylindrical nesting arrangements.

---

My invention relates to plate construction, and more particularly to pans or plates for baking pies, or the like.

The pie pans that are presently available cannot be stacked while the pies are disposed therein. Thus, the pie pans must be stored for delivery or the like on cumbersome shelf-like arrangements. Additionally, although pies are served in sections, they are not baked in sections.

Accordingly, an object of my invention is to provide plates or pans that may be plain, or sectionally arranged.

Another object of my invention is to provide devices that may be constructed of permanent, or disposable material.

Still another object of my invention is to provide devices of the character described that is formed in a manner to permit one plate to be supported onto another, in a nested position.

A further object of my invention is to provide a pie-plate, or the like, that may be formed into an integral unit, with or without spaced sections.

It is manifest to anyone familiar with the culinary art, that the conventional pie-plate supporting a pie, must be stored as an individual item, and cannot be stacked one upon another while the contents are still disposed therein.

It is also a known fact that pies are baked as an individual item, and must be cut into sections of triangular contour when the product is removed from the pie-plate in which it has been baked.

The device illustrated, described, and claimed herein permits the housewife, or the like to bake more than one kind of pie in a sectionally arranged plate, a number of pies may be stacked one above the other, before and after baking, which provides ease in transportation, and space saving during storage. If the sectionally constructed pie-plates are used, individual sections may be removed with a conventional spatula without disturbing the remaining pieces in the plate.

Then too, it is practical and convenient to place ice-cream into the plurality of sections of the partitioned plate which may then be stored in the freezing compartment of a refrigerator, thereby enabling the individual sections of ice-cream to be removed, and placed onto sections of pie for pie a la mode.

The device is simple in construction, may be made as a permanent pie-plate, or may be constructed of thin aluminum or the like, which may be disposed of after use.

Other and further objects of my invention will become more apparent as the description proceeds, when taken in conjunction with the drawings, in which:

FIG. 1, is a perspective view of the device without partitions.

FIG. 2, is a similar view of the device equipped with partitions extending upward therein.

FIG. 3, is a top view of the device as shown in FIG. 2.

FIG. 4, is a vertical cross-sectional view of the device as shown in FIG. 1.

FIG. 5, is a vertical cross-sectional view of the device as shown in FIG. 2, and FIG. 6, is a vertical cross-sectional view of a plurality of plates as shown in FIG. 1, stacked one on top of another.

Similar characters of reference indicate coresponding parts and features throughout the several views, and referring now to the same, the character 10, shows generally a pie-plate of circular contour, which may be constructed of rigid sheet metal, or may be formed of thin metal, such as sheet aluminum, or the like, and may be of any shape or contour.

The bottom 11, of the pie-plate 10 is recessed from the top edge 12, in a tapered manner, as shown by the character number 13. The top edge 12 is recessed to form a ledge from which the sides 15 extend downward so that the plates 10 may be placed onto one another, by engaging the lower edge of the sides 15, into the ledge 14 of the bottom plate.

The entire inner recessed portion of the plate 10 may be spaced off into separate section 16 (see FIGS. 2 and 5), by vertical walls 17, extending upward from the recessed bottom 11 and the tapered portions 13, to provide equal wedge type spaces. The walls 17 may be integral with the bottom 11 as shown in FIG. 5.

If desired the downwardly extending sides 15 may be provided with openings shown as 18, which may be of any shape or size, to permit one plate to be lifted easily off another plate, and also to permit air circulation over the pies, which are shown in phantom as 19, when the pie-plates 10 are stacked one onto the other as shown in FIG. 6.

From the above description it will become manifest that the device is designed and constructed in a manner to give positive performance for the purpose for which it is intended. It is simple in construction, easy to manufacture, and may be used as a permanent item, or may be disposable.

The construction is such that will permit the housewife, or the like to bake pies and stack them onto one another for ease in handling, storing, and transportation.

If desired the sectionally constructed plates will permit variation in the type of pie being baked, and the individual portions may be removed in the conventional manner permitting the rest of the portions to be stored for future use. Nesting the filled plates one into another saves storage space and provides ease in handling.

Having thus described my invention, what I claim and desire to secure by Letters Patent of the United States is:

1. An improved baking pan for use in baking and storing pies and the like,
   said pan comprising a top edge,
   an inner bottom section recessed from said top edge in a tapered manner,
   external wall means around the outer periphery of said pan forming an apron that extends below said inner bottom section,
   nesting means including said external wall means and an outer ledge,
   said outer ledge comprising a recessed section of said top edge for enabling said pans to be stacked without damaging said pies and the like,
   said external wall means comprising handle means to facilitate handling of said pans, and
   said handle means comprising spaced apertures in said apron.

2. The improved baking pan of claim 1, wherein the outer diameter of said ledge is equal to the outer diameter of said external wall, and wherein said ledge is at least as thick as said wall whereby said pans when stacked, form a regular cylinder.

References Cited

UNITED STATES PATENTS

| | | | |
|---|---|---|---|
| 847,117 | 3/1907 | Salmon | 99—339 |
| 883,296 | 3/1908 | Cook | 99—430 |
| 1,060,500 | 4/1913 | Salmon | 99—339 |
| 1,944,365 | 1/1934 | Patchell et al. | |
| 2,156,583 | 5/1939 | Chaplin | 211—126 XR |
| 2,514,845 | 7/1950 | Collins | 99—430 |
| 2,623,656 | 12/1952 | Rottau | 220—97 |
| 2,957,601 | 10/1960 | Novick. | |

FOREIGN PATENTS 1,217,912  12/1959  France.

WALTER A. SCHEEL, Primary Examiner

A. O. HENDERSON, Assistant Examiner

U.S. Cl. X.R.

220—97